United States Patent [19]
Henning et al.

[11] Patent Number: 6,129,331
[45] Date of Patent: Oct. 10, 2000

[54] LOW-POWER THERMOPNEUMATIC MICROVALVE

[75] Inventors: Albert Karl Henning, Palo Alto; Mark Zdeblick, Portola Valley; John Stuart Fitch, Los Altos; Dean Allyn Hopkins, Jr., San Jose; Leslie Joe Lilly, Santa Cruz, all of Calif.

[73] Assignee: Redwood Microsystems, Menlo Park, Calif.

[21] Appl. No.: 09/082,423

[22] Filed: May 20, 1998

Related U.S. Application Data

[60] Provisional application No. 60/047,346, May 21, 1997.

[51] Int. Cl.$^7$ ..................................................... F16K 31/02
[52] U.S. Cl. ............................................. 251/11; 137/341
[58] Field of Search ................................ 251/11, 129.01; 137/334, 341

[56] References Cited

U.S. PATENT DOCUMENTS

| | | |
|---|---|---|
| 2,833,507 | 5/1958 | Dube et al. |
| 4,347,976 | 9/1982 | Jakobsen ................. 251/11 X |
| 4,821,997 | 4/1989 | Zdeblick . |

FOREIGN PATENT DOCUMENTS

| 1373495 | 12/1964 | France ....................................... 251/11 |
|---|---|---|

*Primary Examiner*—Kevin Lee
*Attorney, Agent, or Firm*—William S. Galliani; Pennie & Edmonds LLP

[57] ABSTRACT

A thernopneumatic valve comprises a fluid channel plate defining a fluid port. A diaphragm plate is attached to the fluid channel plate. The diaphragm plate includes a displaceable diaphragm to selectively obstruct the fluid port of the fluid channel plate. A thermal isolating heater is connected to the diaphragm plate. The thermal isolating heater includes a thermal isolating heater body with a heating surface, a perimeter wall defining an extended axial cavity to confine a thermopneumatic working fluid that is used to control the position of the displaceable diaphragm, and a diaphragm obstruction structure to limit the motion of the displaceable diaphragm into the extended axial cavity.

22 Claims, 4 Drawing Sheets

LOW-POWER THERMOPNEUMATIC MICROVALVE

This application claims priority to the provisional patent application entitled "A Thermopneumatically Actuated Microvalve for Liquid Expansion and Proportional Control", filed May 21, 1997, Ser. No. 60/047,346.

This work was funded in part by the Defense Advanced Research Projects Agency, Contract #DAAL01-94-C-3401. The U.S. Government may have certain rights in this technology.

BRIEF DESCRIPTION OF THE INVENTION

This invention relates generally to valves for controlling fluids. More particularly, this invention relates to a low-power micrometer thermopneumatic valve that is particularly useful for the proportional control of fluid flows, such as refrigerant liquids.

BACKGROUND OF THE INVENTION

A microvalve is a valve whose fluid control barrier is less than a millimeter thick, preferably less than 0.5 millimeters thick, and most preferably approximately 0.05 millimeters thick. Thermopneumatic working fluids are used to control microvalves. Thermopneumatically controlled microvalves have been used to control the flow of water and non-corrosive gases over wide ranges of pressure and mass flow conditions.

Attempts to expand the utilization of microvalves have identified problems with existing microvalve designs. For example, existing microvalves cannot be used to control temperature-sensitive fluids, such as refrigerants. This incompatibility stems from a number of factors. For example, existing microvalves are relatively high power devices. In this context, relatively high power devices are devices that operate at 5 Watts or more. High power devices of this type dissipate relatively large amounts of heat, which is transferred to the fluid being controlled. It is important to significantly reduce this problematic heat transfer between a high power microvalve and the temperature sensitive fluid that it controls. It would be highly desirable to develop a low power microvalve, for example, a microvalve that requires less than 2.5 Watts for activation, preferably less than 1 Watt, and most preferably less than 0.5 Watt. In addition to a low-power attribute, the microvalve should preferably withstand a pressure drop and temperature range necessary for new microvalve applications, such as, for the control of refrigerant liquids.

SUMMARY OF THE INVENTION

The apparatus of the invention is a thermopneumatic valve comprising a fluid channel plate defining a fluid port. A diaphragm plate is attached to the fluid channel plate. The diaphragm plate includes a displaceable diaphragm to selectively obstruct the fluid port of the fluid channel plate. A thermal isolating heater is connected to the diaphragm plate. The thermal isolating heater includes a thermal isolating heater body with a heating surface, a perimeter wall defining an extended axial cavity to confine a thermopneumatic working fluid that is used to control the position of the displaceable diaphragm, and a diaphragm obstruction structure to limit the motion of the displaceable diaphragm into the extended axial cavity.

The invention also includes a method of bonding a microvalve formed as a sandwich of materials including adjacent Pyrex substrates. The method includes the steps of depositing a silicon interlayer between adjacent Pyrex substrates and anodically bonding the adjacent Pyrex substrates until a final bonding current of a predetermined fraction of an original bonding current is achieved. The materials and structure of the microvalve of the invention allow it to operate at less than 0.5 Watts. This low-power operation has a minimal thermal impact on the controlled fluid. The device provides proportional flow control and is compatible with macro-scale fluid control fixtures. The invention overcomes the difficult problem of bonding Pyrex to Pyrex. The device of the invention also reduces the problem of diaphragm damage stemming from the "snap back" of the diaphragm upon cooling of the thermopneumatic working fluid.

BRIEF DESCRIPTION OF THE DRAWINGS

For a better understanding of the invention, reference should be made to the following detailed description taken in conjunction with the accompanying drawings, in which.

Like reference numerals refer to corresponding parts throughout the drawings.

DETAILED DESCRIPTION OF THE INVENTION

Figure 1:
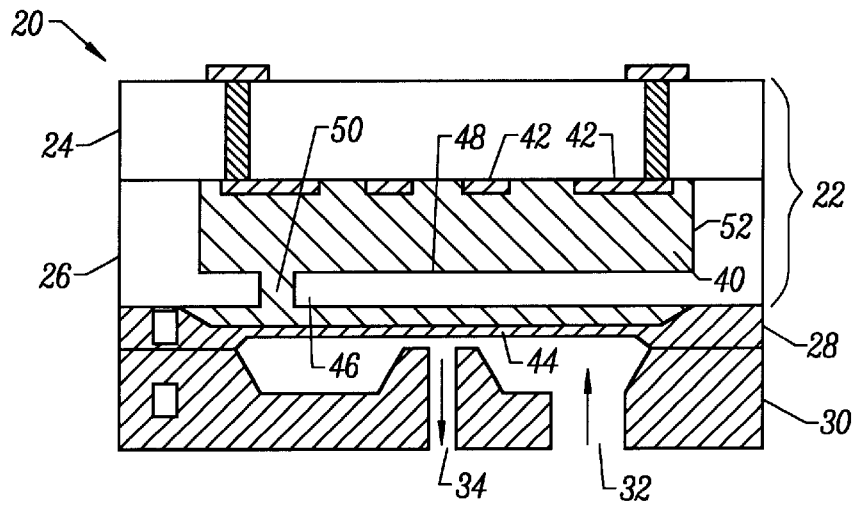
FIG. 1 is a cross-sectional view of a low-power thermopneumatic microvalve in accordance with an embodiment of the invention.

FIG. 1 is a cross-section view of a low-power thermopneumatic microvalve constructed in accordance with an embodiment of the invention. The microvalve 20 includes a novel thermal isolating heater 22. The heater 22 may be implemented with a heating plate 24 connected to a thermal isolation plate 26. Preferably, the heating plate 24 and the thermal isolation plate 26 are formed of a highly heat insulating material, such as Pyrex. If Pyrex is selected, a novel anodic bonding technique, discussed below, may be used to construct the device 20.

The microvalve 20 also includes a diaphragm plate 28 and a fluid channel plate 30, each of which is preferably formed of Silicon. The fluid channel plate 30 includes an input fluid port 32 and an output fluid port 34. The device 20 of FIG. 1 is constructed as a normally open valve. Such a configuration is ideal for use in connection with the control of refrigerants, because when valves in this context fail, they are expected to fail in an open state.

The main components of the device 20 have been described. Attention presently turns to a discussion of their operation and of the benefits associated with the device. The described elements are bonded into a sandwich, as discussed below, to form a unitary structure. A thermopneumatic working fluid 40, such as an organic, dielectric liquid is loaded into the device. Fluorinert®, sold by 3M, Minneapolis, Minn. is preferably used. Resistive heaters 42 are then activated, causing the thermopneumatic fluid 40 to expand. This expansion forces a displaceable diaphragm 44 of the diaphragm plate 28 to be pushed against the output port 34, thereby blocking fluid flow through the device 20. Observe that the displaceable diaphragm 44 may be controlled to provide proportional flow control of the fluid passing through the device 20.

When the resistive heaters 42 are de-activated, the thermopneumatic fluid 40 cools, which allows the displaceable diaphragm 44 to return to its fully open position. This cooling operation has been problematic in the prior art because prior art displaceable diaphragms 44 have tended to "snap back" in a direction opposite of the closed valve position. The snap back phenomenon results in substantial damage or failure to the displaceable diaphragm 44.

The present invention alleviates or solves the snap back problem by using a diaphragm obstruction structure 46 that limits the amount of backward motion through which the diaphragm 44 may traverse. In the embodiment of FIG. 1, the diaphragm obstruction structure 46 is constructed as a base surface 48 of the thermal isolation plate 26. The base surface 48 includes an aperture 50 through which the thermopneumatic fluid 40 may pass.

Observe in FIG. 1 that the thermal isolation plate 26 has a perimeter wall 52. The perimeter wall 52 is relatively long in the axial dimension of the device 20. For example, the axial dimension of the thermal isolation plate 26 should be at least as long as the axial length of the diaphragm plate 28, preferably, the axial dimension of the thermal isolation plate 26 is twice as long as the axial length of the diaphragm plate 28. The device has been implemented with a diaphragm plate 28 with an axial length of 0.5 mm and a thermal isolation plate 26 with an axial length of between 0.5 mm and 1.5 mm, preferably approximately 1 mm. The relatively large axial length of the thermal isolation plate 26 provides thermal isolation between the resistive heaters 42 and the controlled fluid passing through the fluid channel plate 30. The diaphragm obstruction structure 46 facilitates the relatively large axial length because it insures that the diaphragm 44 does not snap back into the relatively large cavity that the thermal isolation plate 26 creates.

Those skilled in the art will recognize that the device of the invention provides outstanding thermal isolation between the resistive heaters 42 and the controlled fluid moving through the fluid channel plate 30. The device of FIG. 1 has reliably operated at below 0.5 Watts. Consequently, there has been negligible conduction heating of the controlled fluid. In addition, the thermal isolation has reduced the convective heat transfer rates at the diaphragm 44 stemming from the passage of a controlled fluid. As a result, the passage of controlled fluid does not markedly increase the required power input to the resistive heater 42. Therefore, relatively low power can still be used to control the thermopneumatic working fluid.

These benefits are attributable to a number of design parameters. First, the extended axial length of the thermal isolation plate 26 provides thermal insulation. This benefit is available because the diaphragm obstruction structure limits snap back of the diaphragm 44. Next, the use of Pyrex in the thermal isolation plate 26 and the heating plate 24 affords additional thermal insulation. This Pyrex to Pyrex bond is feasible in view of the novel anodic bonding technique described below. The thermal isolation achieved by the invention is also attributable to the highly insulative thermopneumatic fluid, Fluorinert.

Figure 2:
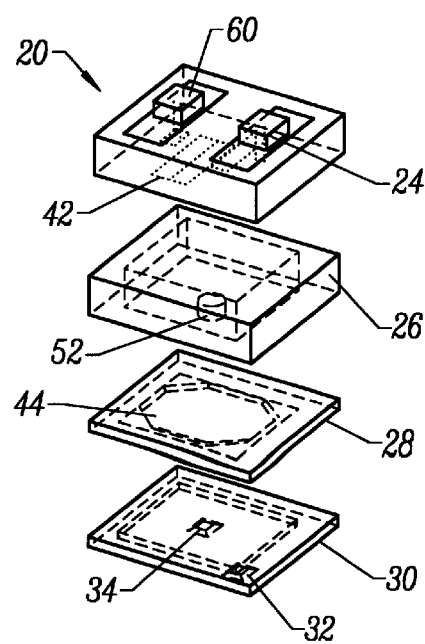
FIG. 2 is an exploded view of the device of FIG. 1.

FIG. 2 is an exploded view of the elements of FIG. 1. The figure shows the heating plate 24, the thermal isolation plate 26, the diaphragm plate 28, and the fluid channel plate 30. Observe in FIG. 1 that the heating plate 24 includes a sealing plug 60. The sealing plug 60 is used to seal the thermopneumatic fluid 40 in the device 20.

As mentioned above, the diaphragm plate 28 and the fluid channel plate 30 are preferably formed of silicon. Silicon to Silicon bonding is well known in the art. Therefore, any number of techniques (e.g., fusion bonding) may be used to accomplish this bond. It was also previously mentioned that the thermal isolation plate 26 is preferably formed of Pyrex. The bonding of a Pyrex substrate, such as the thermal isolation plate 26, to a Silicon substrate, such as diaphragm plate 28, is known in the art. Therefore, any number of techniques may be used to accomplish this bond.

While some conventional bonding techniques are used to construct the device of the invention, one aspect of the invention is to provide a novel Pyrex to Pyrex bonding method. Prior art attempts to achieve Pyrex to Pyrex bonding have relied upon fusion bonding. In fusion bonding, the substrates to be bonded are exposed to a high temperature such that they melt and bond. Pyrex, a form of glass, is very difficult to work with in a liquid or slurry state. Thus, prior art attempts to bond Pyrex to Pyrex have resulted in relatively low process yields. To avoid the shortcomings associated with fusion bonding techniques, the following anodic bonding process may be used to construct the device of the invention.

In short, the process involves the deposition of a silicon interlayer between adjacent Pyrex substrates. The Pyrex substrates are then anodically bonded until a final bonding current of a predetermined fraction of an original bonding current is achieved.

A more detailed description of the process follows. An initial step is to clean one Pyrex wafer (e.g., the thermal isolation plate 26). The Pyrex may be cleaned in a liquid bath of $H_2O_2$ and $H_2SO_4$ 1:100 at 100° C. or in an $O_2$ plasma. Afterwards, approximately 1 micro-meter of lightly-doped (0.01 ohm-cm) boron-doped silicon may be deposited on one side of the Pyrex wafer. Silicon interlayers between 0.1 micro-meter and 1 micro-meter may be used. Both Pyrex wafers are then cleaned. For example, they may both be cleaned in a liquid bath of $H_2O_2$ and $H_2SO_4$ 1:100 at 100° C. or in an $O_2$ plasma.

The coated Pyrex layer is then placed on the bond plate, with the silicon-coated side up. The second, uncoated Pyrex plate is placed on top of the first, coated Pyrex wafer. The bonding plate temperature is then ramped to 475° C. The processing is successful if a temperature of 475° C. or higher is used.

The bonding plate is then grounded electrically. A voltage of −700V is applied to the top Pyrex wafer at a single point in the wafer center. The current is then monitored. An original bonding current of approximately 32 mA will result for a four inch wafer. When the current drops below 1 mA, the bond is complete.

The wafers are then allowed to cool to room temperature. The wafers are then removed from the bonding plate. Thereafter, they are ready for further processing.

Those skilled in the art will appreciate that this bonding technique will not damage the resistors used in the microvalve.

Many of the main features of the invention have now been described.

Attention presently turns to a discussion of alternate embodiments of the invention and descriptions of physical parameters associated with various devices constructed in accordance with the invention.

Figures 3, 4:
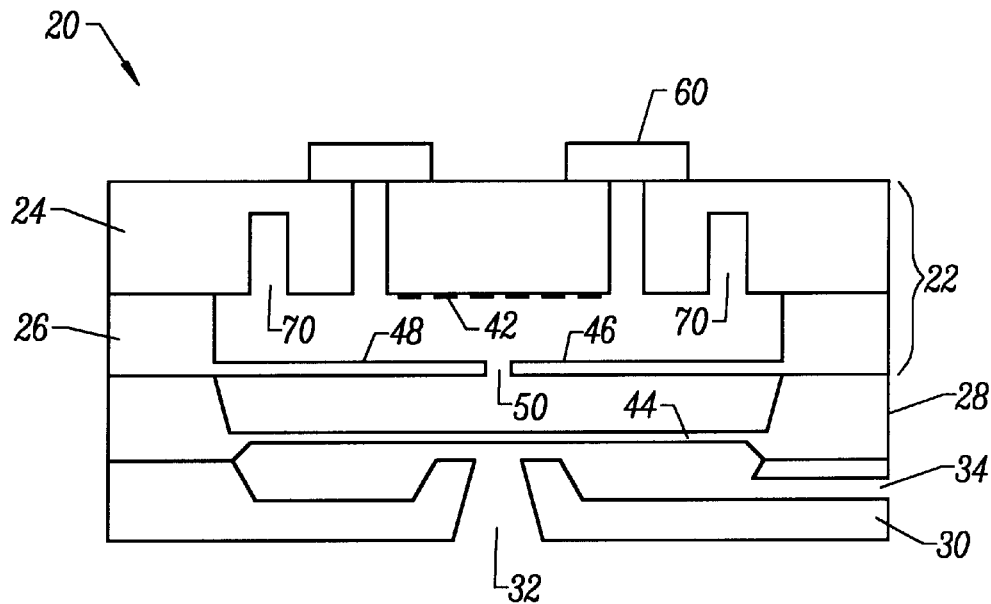
FIG. 3 is a cross-sectional view of a low-power thermopneumatic microvalve in accordance with another embodiment of the invention.
FIG. 4 is a cross-sectional view of a low-power thermopneumatic valve in accordance with yet another embodiment of the invention.

FIG. 3 is a cross-sectional view of an alternate embodiment of the microvalve 20 of the invention. The device of FIG. 3 generally corresponds with the device of FIG. 1, although there are a number of noteworthy distinctions. First, the fluid channel plate 30 has a radial output port 34, instead of an axial output port, as shown in FIG. 1. Next, the thermal isolation plate 26 has its base surface aperture 50 positioned at the center of the base surface 48. Also, the heating plate 24 includes one or more heat exchange trenches 70. Each trench 70 increases the heat path length and forces more of the heat from the heating plate 24 into the highly thermally resistive thermopneumatic fluid 40. This embodiment takes advantage of the lower heat conductivity of the thermopneumatic fluid 40 in the trench 70 to increase the thermal path by requiring the heat to travel a longer distance to reach the diaphragm 44. This embodiment is particularly useful if the heating plate 24 is formed of Silicon instead of Pyrex. A Silicon heating plate results in lower tooling and material costs. A silicon heating plate also facilitates the use of active circuitry incorporated into the valve.

FIG. 4 illustrates another embodiment of the microvalve 20 of the invention. In this embodiment, the thermal isolating heater 22 uses a simple thermal isolation plate 26, which does not include a diaphragm obstruction structure. Instead, the diaphragm obstruction structure 46 is formed as a set of plateaus extending from the heater surface of the heating plate 24.

Figure 5:
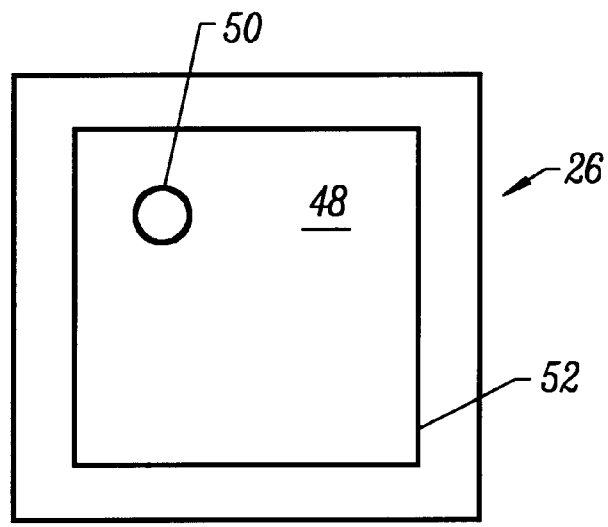
FIG. 5 is a top plan view of a thermal isolation plate constructed in accordance with an embodiment of the invention.
Figure 6:
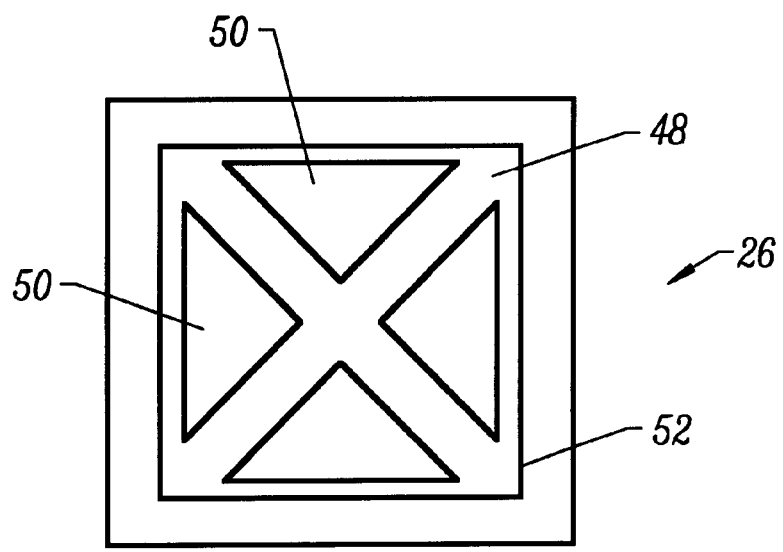
FIG. 6 is a top plan view of a thermal isolation plate constructed in accordance with another embodiment of the invention.

FIG. 5 is a top plan view of a thermal isolation plate 26. The figure illustrates the previously described perimeter wall 52, base surface 48, and base surface aperture 50. FIG. 6 is a top plan view of another thermal isolation plate 26 that may be used in accordance with the invention. The embodiment of FIG. 6 utilizes a set of triangularly-shaped apertures 50. This embodiment exploits the highly insulative nature of the thermopneumatic fluid 40. That is, since the low thermal conductivity of the thernopneumatic liquid is a principal reason for the high thermal isolation between the resistive heater 42 and the diaphragm 44, increasing the area of these apertures lowers the overall power required to close the valve. At the same time, the configuration of FIG. 6 provides a strong mechanical span in the vicinity of the diaphragm 44 in order to defeat rupture of the diaphragm 44 when excessive cooling (and attendant shrinkage) occurs in the thermopneumatic fluid.

Figure 7:
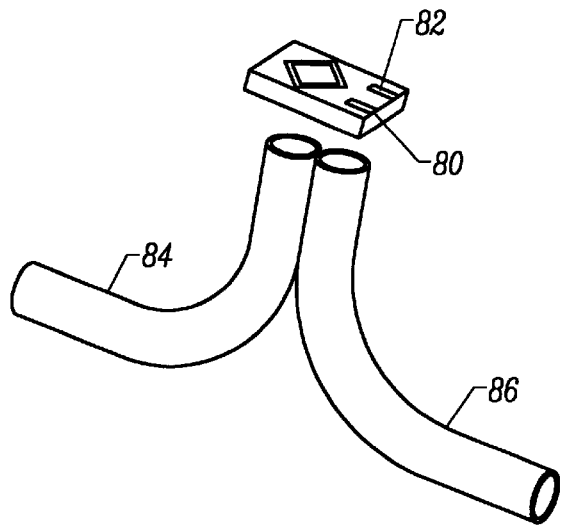
FIG. 7 is a perspective view of a dual pipe fitting that may be used in connection with the device of the invention.

FIG. 7 is a perspective view of macro-scale fittings that may be used to connect the microvalve 20 of the invention to a controlled fluid. The controlled fluid passes through a first pipe 84, which may be formed of copper, and exits through a second pipe 86, which may also be formed of copper. The microvalve 20 is positioned at the junction between the pipes 84, 86. In particular, the microvalve 20 is attached to a ceramic substrate 80. Preferably, the ceramic substrate 80 includes a set of conventional electrical connections or leads 82.

Figure 8:
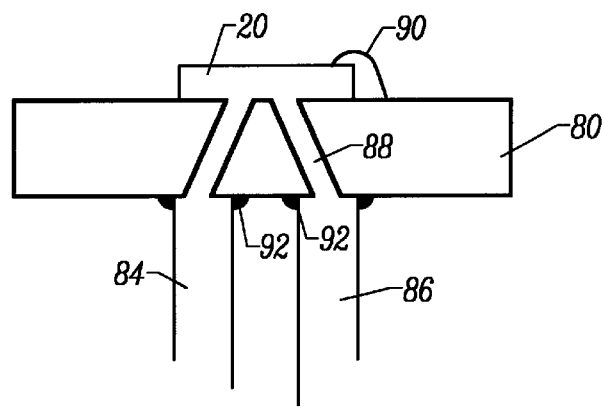
FIG. 8 is a cross-sectional view of the device of FIG. 7.
Figure 9:
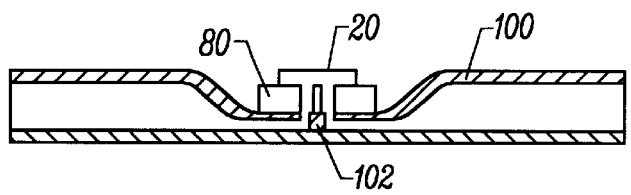
FIG. 9 is a side view of a crimped pipe fitting that may be used in connection with the device of the invention.

FIG. 8 is a cross-sectional view of the substrate 80 welded to the pipes 84 and 86. The figure shows welding material 92 at the interface between the pipes 84, 86 and the substrate 80. The figure also shows apertures 88 formed in the substrate 80 that allow fluid communication with the microvalve 20. Finally, the figure shows a bond wire 90 between the ceramic substrate 80 and the microvalve 20. FIG. 9 illustrates an alternate technique for attaching the microvalve 20 to an external pipe. In this embodiment, the pipe 100 is crimped, a hole is drilled at the center of the crimp, and a dividing wall 102 is placed at the center of the hole, if the dividing wall is not pre-formed in the pipe. The dividing wall defines an input port and an output port. Thereafter, the ceramic substrate 80 may be secured over the input and output ports.

Attention now turns to particular design parameters associated with various embodiments of the invention. The heating plate 24 has been constructed with 50 Ohm Platinum resistive heaters 42. Holes have been ultrasonically formed in the heating plate 24 for electrical feedthroughs and for thermopneumatic fluid loading ports.

The thermal isolation plate 26 may also be patterned ultrasonically. The Silicon diaphragm plate 28 and Silicon fluid channel plate 30 may be patterned using KOH and fillet etching (HF:Nitric:Acetic). The silicon diaphragm 44 has been implemented with a thickness of 50 micro-meters and with a diaphragm area of approximately 13.2 mm$^2$.

The copper tubes 84 and 86 have been implemented as ¼ inch diameter devices that are brazed to the ceramic substrate 80. The microvalve 20 has been attached to the substrate 80 using a Au—Sn eutectic bonding process following the ceramic-copper brazing process. The final fabrication step involves filling the microvalve 20 with Fluorinert, capping the fill holes, attaching wire bonds and leads, and applying silicone on top of the valve to provide mechanical support for the electrical connections. Preferably, suction flow (instead of impingement flow) is used in the tubes 84, 86.

Compatibility of the wetted materials with the fluid controlled by the microvalve is a critical issue. None of the materials used on the disclosed microvalve suffer significant degradation when exposed to R-134a, and R-134a/ester oil mixtures.

The device of the invention has been applied as an expansion valve to the problem of proportional control of refrigerants. Differential pressures of 140 psid (approximately 1 MPa) have been sustained across the valve. Flow rates between 2 and 12 grams per second for the refrigerant R-134a have been demonstrated. These flow rates and pressures make the valve an ideal, active-mode candidate to replace passive-mode capillary tubes, commonly used in home refrigeration, automotive air conditioning, and smaller scale commercial air conditioning applications. The replacement of a passive capillary tube with the active electronic expansion valve of the invention can yield energy efficiency improvements of between 2 and 14 percent in these applications. On-to-off transition times on the order of 1 second have been achieved. Such speeds are consistent with the requirements for air conditioning and refrigeration applications. The valve of the invention is ideal for the control of water in ice makers. The valve of the invention is also ideal for precision control of liquid and mass flow in semiconductor processing equipment.

The foregoing description, for purposes of explanation, used specific nomenclature to provide a thorough understanding of the invention. However, it will be apparent to one skilled in the art that the specific details are not required in order to practice the invention. In other instances, well known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What is claimed is:

1. A thermopneumatic valve, comprising:
   a fluid channel plate defining a fluid port;
   a diaphragm plate attached to said fluid channel plate, said diaphragm plate including a displaceable diaphragm to selectively obstruct said fluid port of said fluid channel plate, said diaphragm plate being formed with a semiconductor material; and
   a thermal isolating heater connected to said diaphragm plate, said thermal isolating heater including a thermal isolating heater body with a heating surface, a perimeter wall defining an extended axial cavity to confine a thermopneumatic working fluid that is used to control the position of said displaceable diaphragm, and a diaphragm obstruction structure to limit the motion of said displaceable diaphragm into said extended axial cavity.

2. The thermopneumatic valve of claim 1 wherein said fluid channel plate includes a second fluid port.

3. The thermopneumatic valve of claim 2 wherein said first fluid port and said second fluid port define apertures through an axial dimension of said fluid channel plate.

4. The thermopneumatic valve of claim 2 wherein said first fluid port defines an aperture through an axial dimension of said fluid channel plate and said second fluid port defines an aperture through a radial dimension of said fluid channel plate.

5. The thermopneumatic valve of claim 1 wherein said fluid channel plate is formed of Silicon.

6. The thermopneumatic valve of claim 1 wherein said diaphragm plate is formed of Silicon.

7. The thermopneumatic valve of claim 1 wherein said displaceable is less than a millimeter thick.

8. The thermopneumatic valve of claim 1 wherein said thermal isolating heater includes a heating plate connected to a thermal isolation plate.

9. The thermopneumatic valve of claim 8 wherein said heating plate is used for said heating surface.

10. The thermopneumatic valve of claim 8 wherein said diaphragm obstruction structure is formed as a plateau on said heating plate.

11. The thermopneumatic valve of claim 9 wherein said heating plate includes a heat exchange trench.

12. The thermopneumatic valve of claim 8 wherein said heating plate is formed of Pyrex.

13. The thermopneumatic valve of claim 8 wherein said heating plate is formed of Silicon.

14. The thermopneumatic valve of claim 8 wherein said thermal isolation plate defines said perimeter wall such that said extended axial cavity is at least as long as the axial length of said diaphragm plate.

15. The thermopneumatic valve of claim 14 wherein said thermal isolation plate includes a base surface defining said diaphragm obstruction structure.

16. The thermopneumatic valve of claim 15 wherein said base surface includes an aperture to allow said thermopneumatic working fluid to flow between said extended axial cavity and said displaceable diaphragm.

17. The thermopneumatic valve of claim 15 wherein said base surface includes a plurality of apertures to allow said thermopneumatic working fluid to flow between said extended axial cavity and said displaceable diaphragm.

18. The thermopneumatic valve of claim 8 wherein said thermal isolation plate is formed of Pyrex.

19. The thermopneumatic valve of claim 1 wherein said thermopneumatic working fluid is an organic, dielectric liquid.

20. The thermopneumatic valve of claim 1 in combination with a ceramic substrate attached to said fluid channel plate.

21. The thermopneumatic valve of claim 20 in combination with a set of tubes connected to said ceramic substrate.

22. The thermopneumatic valve of claim 20 in combination with a crimped tube connected to said ceramic substrate, said crimped tube including an input port and an output port.

* * * * *